(12) United States Patent
Ferraro et al.

(10) Patent No.: US 7,371,806 B2
(45) Date of Patent: May 13, 2008

(54) PROCESS FOR THE PREPARATION OF ETHYLENE COPOLYMERS

(75) Inventors: Angelo Ferraro, Bologna (IT); Tiziano Dall'Occo, Ferrara (IT); Giuliano Cecchin, Ferrara (IT)

(73) Assignee: Basell Poliolefine Italia S.p.A., Milan (IT)

( * ) Notice: Subject to any disclaimer, the term of this patent is extended or adjusted under 35 U.S.C. 154(b) by 229 days.

(21) Appl. No.: 10/503,104

(22) PCT Filed: May 30, 2003

(86) PCT No.: PCT/EP03/05787

§ 371 (c)(1),
(2), (4) Date: Jul. 28, 2004

(87) PCT Pub. No.: WO03/106514

PCT Pub. Date: Dec. 24, 2003

(65) Prior Publication Data

US 2005/0107539 A1    May 19, 2005

(30) Foreign Application Priority Data

Jun. 13, 2002   (EP) .................................. 02077339

(51) Int. Cl.
C08F 210/02 (2006.01)
(52) U.S. Cl. ................ 526/348; 526/348.3; 526/124.2; 526/124.3
(58) Field of Classification Search ................ 526/348, 526/348.3, 124.2, 124.3
See application file for complete search history.

(56) References Cited

U.S. PATENT DOCUMENTS

| | | | |
|---|---|---|---|
| 4,220,554 A | 9/1980 | Scatá et al. | 252/429 B |
| 4,399,054 A | 8/1983 | Ferraris et al. | 252/429 B |
| 4,732,940 A * | 3/1988 | Yamaoka et al. | 525/194 |
| 4,895,903 A | 1/1990 | Kobayashi et al. | 525/133 |
| 5,122,492 A * | 6/1992 | Albizzati et al. | 502/120 |
| 5,731,393 A * | 3/1998 | Kojoh et al. | 526/124.8 |
| 5,733,987 A | 3/1998 | Covezzi et al. | 526/65 |
| 6,231,804 B1 | 5/2001 | Yamauchi et al. | 264/488 |
| 6,300,273 B1 * | 10/2001 | Sacchetti et al. | 502/126 |
| 6,998,458 B2 | 2/2006 | Vitale et al. | |
| 7,208,436 B2 | 4/2007 | Dall'Occo et al. | |
| 2004/0014597 A1* | 1/2004 | Morini et al. | 502/126 |

FOREIGN PATENT DOCUMENTS

| | | |
|---|---|---|
| EP | 0191900 | 8/1986 |
| EP | 0344755 | 12/1989 |
| EP | 0361205 | 4/1990 |
| EP | 0361493 | 4/1990 |
| EP | 0434082 | 6/1991 |
| EP | 0490353 | 6/1992 |
| EP | 0633270 | 1/1995 |
| EP | 0641807 | 3/1995 |
| EP | 0669347 | 8/1995 |
| EP | 0763553 | 3/1997 |
| EP | 0972800 | 1/2000 |
| JP | 03294308 | 12/1991 |
| JP | 03294309 | 12/1991 |
| JP | 03294310 | 12/1991 |
| JP | 03294319 | 12/1991 |
| JP | 08208943 | 8/1996 |
| JP | 09227615 | 9/1997 |
| JP | 09227616 | 9/1997 |
| WO | 9221706 | 12/1992 |
| WO | 9303078 | 2/1993 |
| WO | 02100904 | 12/2002 |
| WO | 03/099883 | 12/2003 |
| WO | 03/106511 | 12/2003 |

OTHER PUBLICATIONS

K. Sugimura et al., "Preparation of olefin polymers with good heat and impact resistances, mechanical strength, and moldability," *Chemical Abstracts Service*, STN, Database acession No. 127:234764; XP002257077.

K. Sugimura et al., "Preparation of olefin polymers with good heat and impact resistances, mechanical strength, and moldability," *Chemical Abstracts Service*, STN, Database accession No. 127:234763; XP002257078.

K. Sugimura et al., "Olefin polymer compositions with high rigidity and impact strength," *Chemical Abstracts Service*, STN, Database accession No. 125:277638; XP002257079.

M. Kioka et al., "Preparation of ethylene- .alpha. -olefin copolymers," *Chemical Abstracts Service*, STN, Database accession No. 116:215122; XP002257080.

(Continued)

*Primary Examiner*—Ling-Sui Choi
(74) *Attorney, Agent, or Firm*—William R Reid

(57) ABSTRACT

Process for the preparation of ethylene copolymers comprising the copolymerization of ethylene with olefins $CH_2=CHR$, in which R is a hydrocarbyl radical with 1-12 carbon atoms carried out in the presence of a catalyst comprising (i) a solid catalyst component comprising Mg, Ti, halogen and specific 1,3-diethers of formula (I) in which R is a $C_1$-$C_{10}$ hydrocarbon group, $R_1$ is methyl or ethyl, optionally containing a heteroatom, and $R_2$ is a C4-C12 linear alkyl optionally containing a heteroatom, and (ii) an organo-Al compound. The obtained copolymers are endowed with good comonomer distribution.

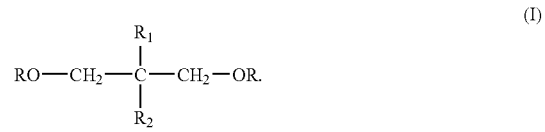

(I)

11 Claims, No Drawings

OTHER PUBLICATIONS

M. Kioka et al., "Preparation of propylene block copolymers," *Chemical Abstracts Service*, STN, Database accession No. 116:215120; XP002257081.

M. Kioka et al., "Preparation of random propylene copolymers," *Chemical Abstracts Service*, STN, Database accession No. 116:215119; XP002257082.

M. Kioka et al., "Preparation of low-crystalline or noncrystalline polyolefins," *Chemical Abstracts Service*, STN, Database accession No. 116:215118; XP002257083.

J. C. Randall, "3.4 Monomer Distributions and Number-Average Sequence Lengths in Ethylene-Propylene Copolymers," *Polymer Sequence Determination Carbon-13 NMR Method*, p. 53-58 (1977).

K. Sugimura et al., "Preparation of olefin polymers with good heat and impact resistances, mechanical strength, and moldability," *Chemical Abstracts Service*, STN, Database acession No. 127:234764; XP002257077, Sep. 2, 1997.

K. Sugimura et al., "Preparation of olefin polymers with good heat and impact resistances, mechanical strength, and moldability," *Chemical Abstracts Service*, STN, Database accession No. 127:234763; XP002257078, Sep. 2, 1997.

K. Sugimura et al., "Olefin polymer compositions with high rigidity and impact strength," *Chemical Abstracts Service*, STN, Database accession No. 125:277638; XP002257079, date.

M. Kioka et al., "Preparation of ethylene- .alpha. -olefin copolymers," *Chemical Abstracts Service*, STN, Database accession No. 116:215122; XP002257080, date.

M. Kioka et al., "Preparation of propylene block copolymers," *Chemical Abstracts Service*, STN, Database accession No. 116:215120; XP002257081, date.

M. Kioka et al., "Preparation of random propylene copolymers," *Chemical Abstracts Service*, STN, Database accession No. 116:215119; XP002257082, date.

M. Kioka et al., "Preparation of low-crystalline or noncrystalline polyolefins," *Chemical Abstracts Service*, STN, Database accession No. 116:215118; XP002257083, date.

* cited by examiner

PROCESS FOR THE PREPARATION OF ETHYLENE COPOLYMERS

This application is the U.S. national stage of International Application PCT/EP03/05787, filed May 30, 2003, claiming priority to European Application No. 02077339.6 filed Jun. 13, 2002.

Ethylene copolymers represent a very broad family of products having a prominent importance in the polyolefin field.

One of the most important groups of ethylene copolymers is constituted by the Linear low-density polyethylene (LLDPE). Due to its characteristics, it finds application in many sectors and in particular in the field of wrapping and packaging of goods where, for example, the use of stretchable films based on LLDPE constitutes an application of significant commercial importance. LLDPE is commercially produced with liquid phase processes (solution or slurry) or via the gas-phase processes. Both processes involve the widespread use of Ziegler-Natta $MgCl_2$-supported catalysts that are generally formed by the reaction of a solid catalyst component, in which a titanium compound is supported on a magnesium halide, with an alkylaluminium compound. In order to be advantageously usable in the preparation of LLDPE, said catalysts are required to show high comonomer incorporation properties and good comonomer distribution suitably coupled with high yields. The above characteristics in fact would ensure the preparation of a product having the desired density and, at the same time, a low content of hydrocarbon soluble fractions.

Another important group of ethylene copolymers is represented by the elastomeric ethylene copolymers such as ethylene/propylene (EPM) elastomers optionally containing smaller proportions of dienes (EPDM). The said elastomers are produced industrially by solution processes or slurry processes carried out, for example, in the presence of certain Ziegler-Natta catalysts based on vanadium compounds such as vanadium acetylacetonate. These catalysts in fact, in view of their good capability to randomly distribute the comonomers, are able to produce a softer and more elastomeric product with respect to the catalysts based on titanium compounds. Their basic downside however, is the fact that they are not able to produce predominantly isotactic crystalline polypropylene and therefore they cannot be used in the production of in-situ heterophasic copolymers such as polypropylene impact copolymers constituted by crystalline polypropylene matrix within which an elastomeric rubbery phase is dispersed. On the other hand, the titanium based catalysts generally do not have a good capability to distribute the comonomer and therefore the quality of the rubbery phase is not particularly high especially when EPR/EPDM polymers with an amount of ethylene in the range of 40-70% by weight (having a satisfactory behavior during vulcanization) are to be produced. In these conditions in fact, the fraction of crystalline ethylene copolymers produced would be so high to deteriorate the properties of the rubber. The availability of this kind of product would be of high importance because the elastomeric copolymers obtained by titanium based catalysts, generally show a better homogeneity with the crystalline matrix.

We have now surprisingly found a process capable to produce ethylene copolymers endowed with good comonomer distribution comprising the copolymerization of ethylene with olefins $CH_2=CHR$, in which R is a hydrocarbyl radical with 1-12 carbon atoms carried out in the presence of a catalyst comprising the product obtained by contacting (i) a solid catalyst component comprising Mg, Ti, halogen and the 1,3-diethers of formula (I)

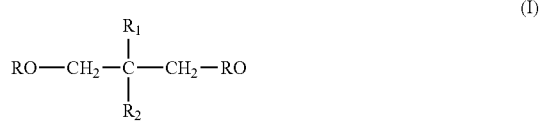

in which R is a $C_1$-$C_{10}$ hydrocarbon group, $R_1$ is methyl or ethyl, optionally containing a heteroatom, and $R_2$ is a C4-C12 linear alkyl group optionally containing a heteroatom, with (ii) an organo-Al compound.

Preferably, R is a C1-C5 alkyl group, $R_1$ is methyl and R2 is a C7-C10 linear alkyl group. Examples of representative 1,3 diethers that are included in the above formula (I) are: 2-methyl-2-pentyl-1,3-dimethoxypropane, 2-methyl-2-n-hexyl-1,3-dimethoxypropane, 2-n-heptyl-2-methyl-1,3-dimethoxypropane, 2-n-octyl-2-methyl-1,3-dimethoxypropane, 2-n-decyl-2-methyl-1,3-dimethoxypropane, 2-ethyl-2-butyl-1,3-dimethoxypropane, 2-ethyl-2-pentyl-1,3-dimethoxypropane, 2-ethyl-2-n-hexyl-1,3-dimethoxypropane, 2-n-heptyl-2-ethyl-1,3-dimethoxypropane, 2-n-octyl-2-ethyl-1,3-dimethoxypropane, 2-n-decyl-2-ethyl-1,3-dimethoxypropane. The use of 2-n-octyl-2-methyl-1,3-dimethoxypropane is particularly preferred.

Particularly preferred are the solid catalyst components comprising a titanium compound, containing at least one Ti-halogen bond, and an internal electron-donor compound chosen from the above mentioned 1,3-diethers, supported on magnesium halide.

In a particular embodiment, the Mg-halide is in active form. The active form of the magnesium halides present in the catalyst components of the invention is recognizable by the fact that in the X-ray spectrum of the catalyst component the major intensity reflection which appears in the spectrum of the non-activated magnesium halides (having surface area smaller than 3 $m^2/g$) is no longer present, but in its place there is a halo with the position of the maximum intensity shifted with respect to the position of the major intensity reflection, or by the fact that the major intensity reflection presents a half-peak breadth at least 30% greater that the one of the corresponding reflection of the non-activated Mg halide. The most active forms are those in which the halo appears in the X-ray spectrum of the solid catalyst component.

Among the magnesium halides, the chloride is the preferred compound. In the case of the most active forms of the magnesium chloride, the halo appears in place of the reflection which in the spectrum of the non-activated magnesium chloride is situated at the interplanar distance of 2.56 Å.

Preferred titanium compounds are the halides or the compounds of formula $TiX_n(OR^4)_{4-n}$, where 0<n<3, X is halogen, preferably chlorine, and $R^4$ is a $C_1$-$C_{10}$ hydrocarbon group. The titanium tetrachloride is the preferred compound. Satisfactory results can also be obtained with the trihalides, particularly $TiCl_3$ HR, $TiCl_3$ ARA, and with the halogen alcoholates such as $TiCl_3$ OR, where R is a $C_1$-$C_{10}$ hydrocarbon radical.

The 1,3-diethers of the present invention can be prepared according to the methods disclosed in the European patent application No.0361493. Said diethers, used in the preparation of Ziegler-Natta catalysts, are generally synthesized by the reaction of alkylating agents with the diols corresponding to the above diethers. A way of synthesis of said diols consists in the reduction of the corresponding malonates.

The preparation of the solid catalyst components can be carried out using various methods. For example, the magnesium halide (preferably used in a form containing less than 1% of water), the titanium compound and the electron-donor compound are milled together under conditions that cause the activation of the magnesium halide; the milled product is then caused to react one or more times with $TiCl_4$ in excess, optionally in the presence of an electron-donor, at a temperature ranging from 80 to 135° C., and then repeatedly washed with a hydrocarbon (such as hexane) until no chlorine ions can be detected in the wash liquid.

According to another method, the anhydrous magnesium halide is preactivated according to known methods and then reacted with an excess of $TiCl_4$ containing the electron-donor compound and optionally an aliphatic, cycloaliphatic, aromatic or chlorinated hydrocarbon solvent (for example hexane, heptane, cyclohexane, toluene, ethylbenzene, chlorobenzene, dichloroethane). In this case also the operation takes place at a temperature between 80° and 135° C. The reaction with $TiCl_4$, in the presence or absence of an electron-donor, is optionally repeated and the solid is then washed with hexane to eliminate the non-reacted $TiCl_4$.

According to a preferred method, a $MgCl_2.nROH$ adduct (particularly in the form of spheroidal particles) where n is generally from 1 to 6, and ROH is an alcohol, preferably ethanol, is caused to react with an excess of $TiCl_4$ containing the electron-donor compound and optionally one of the above mentioned hydrocarbon solvents. The reaction temperature initially is from 0° to 25° C., and is then increased to 80-135° C. Then, the solid is reacted once more with $TiCl_4$, in the presence or absence of the electron-donor, separated and washed with a hydrocarbon until no chlorine ions can be detected in the wash liquid.

These $MgCl_2.nROH$ adduct can be prepared in spherical form from melted adducts, by emulsifying the adducts in a liquid hydrocarbon and thereafter causing them to solidify by fast quenching. A typical method for preparing these spherulized adducts is reported in U.S. Pat. No. 4,399,054, the description of which is herein incorporated by reference. In a preferred method, the thus obtained spherulized adducts can be subjected to thermal dealcoholation at a temperature ranging from 50 and 150° C. until the alcohol content is reduced to values lower than 2 and preferably comprised between 1.5 and 0.3 mols per mol of magnesium dihalide, and are finally treated with chemical reagents capable of reacting with the OH groups of the alcohol and of further dealcoholating the adduct until the content is reduced to values which are generally lower than 0.5 mols.

The treatment with the dealcoholating chemical agents is carried out by using an amount of such an agent which is large enough to react with the OH groups present in the alcohol contained in the adduct. Preferably, the treatment is carried out using a slight excess of said agent, which is then removed prior to the reaction of the titanium compound with the thus obtained support.

In the case in which a total or partial reduction of the valence state of the titanium compound is desired, the chemical dealcoholation of the $MgCl_2.pROH$ adduct can be carried out by using agents having a reducing activity, for instance an Al-alkyl compound such as Al-triethyl, According to yet another method, magnesium alcoholates and chloroalcoholates (the chloroalcoholates can be prepared particularly as described in U.S. Pat. No. 4,220,554) are caused to react with $TiCl_4$ in excess containing the electron-donor compound, operating under the reaction conditions already described.

According to a further method, complexes of magnesium halides with titanium alcoholates (the $MgCl_2.2Ti(OC_4H_9)_4$ complex is a typical example) are caused to react, in a hydrocarbon solution, with $TiCl_4$ in excess containing the electron-donor compound; the separated solid product is reacted again with an excess of $TiCl_4$, in the presence or absence of electron-donor, and then separated and washed with hexane. The reaction with $TiCl_4$ is carried out at a temperature ranging from 800 to 130° C.

According to a variance of the latter method, the $MgCl_2$ and titanium alcoholate complex is caused to react in a hydrocarbon solution with polyhydrosiloxane; the separated solid product is reacted at 50° C. with silicon tetrachloride containing the electron-donor compound; the solid is then reacted with $TiCl_4$ in excess, in the presence or absence of electron-donor, operating at 80°-130° C.

Independently from the specific preparation method, after the last reaction with $TiCl_4$ in the presence of the electron-donor, it is preferable to separate the solid obtained (by way of filtration, for example), and cause it to react with an excess of $TiCl_4$ at temperatures ranging from 80° to 135° C., before washing it with the hydrocarbon solvent.

Finally, it is possible to cause to react $TiCl_4$ in excess and containing the electron-donor with porous resins such as partially cross-linked styrene-divinylbenzene in spherical particle form, or porous inorganic oxides such as silica and alumina, impregnated with solutions of magnesium compounds or complexes soluble in organic solvents.

The porous resins which can be used are described in the European patent application No.0344755.

The $MgCl_2$/electron-donor molar ratio used in the reactions indicated above generally ranges from 2:1 to 30:1, preferably from 4:1 to 12:1.

The electron-donor compound is fixed on the magnesium halide in a quantity generally ranging from 1 to 25% molar with respect to $MgCl_2$.

In particular, the 1,3-diethers of formula (I) are present on the catalyst component in a quantity generally ranging from 5 to 30% weight, preferably from 8 to 25% weight.

In the solid catalyst components the Mg/Ti molar ratio is generally from 30:1 to 3:1; in the components supported on resins or on inorganic oxides the ratio can be different and usually ranges from 20:1 to 2:1.

As explained above, the said catalyst are able to produce ethylene copolymers characterized by a good comonomer distribution. In particular, in the preparation of both linear low density ethylene copolymers and elastomeric ethylene copolymers it have been obtained very good quality products by using catalyst components containing 1,3-diethers of formula 1 in which R is a $C_1$-$C_{10}$ alkyl group, $R_1$ is methyl or ethyl, optionally containing a heteroatom, and $R_2$ is a C4-C12 linear alkyl group optionally containing a heteroatom with the proviso that when $R_1'$ is ethyl $R_2$ is higher than C4.

With these catalysts components and particularly in the cases in which R' is methyl and more particularly with the use of 2-methy-2-octyl-1,3-dimethoxypropane as internal donor, have been obtained elastomeric ethylene copolymers containing from 35 to 70% weight of ethylene, from 30 to 65% weight of an olefin $CH_2$=CHR, in which R a hydrocarbyl radical with 1-12 carbon atoms, and from 0 to 10% of a polyene characterized by (i) a Molecular Weight Distribution expressed by Mw/Mn of higher than 3, (ii) a content of 2-1 regioinvertions of the α-olefin units of lower than 5% and (iii) a value of the Shore A measured according to ASTM D2240 and content by weight of ethylenic units, calculated on the basis of the whole polymer, such that the point defined by such values falls below the curve defined by the following equation:

$$Y=0.0438X^2-4.1332X+A$$

Where Y is the value of the Shore A measured according to ASTM D2240, X is the weight percentage of ethylene units in the polymer calculated by NMR and A is 153. Preferably A is 145 and more preferably 137.

Preferably, the content of 2-1 regioinvertions is lower than 1% and it is also preferred that the Mw/Mn ratio is higher than 4 and more preferably higher than 4.5.

The complex of the above characteristics is the result of the optimal comonomer distribution. In fact, as an additional result the said elastomeric copolymers are also characterized by a low content of insoluble fraction which is generally lower than 15% and in particular lower than 10%.

As already noted, the elastomeric copolymers used in the present invention are also characterized by a low crystallinity. Preferably, the crystallinity, expressed as the enthalpy of fusion determined by DSC analysis, is lower than 10 J/g, more preferably lower than 5.

The said elastomeric copolymers moreover have an intrinsic viscosity [η] ranging from 1 to 6 dl/g, more preferably from 2 to 5 dl/g.

In the elastomeric copolymers of the invention the α-olefin $CH_2=CHR$ is preferably selected among those in which R is an alkyl having from 1 to 3 carbon atoms and in particular propylene. When polyene units are present their amount preferably ranges from 0.1 to 20% by weight, preferably from 1 to 10%. The content by weight of units derived from ethylene is preferably between 35 and 70%, more preferably between 40 and 60%. The content by weight of units derived from the α-olefin is preferably between 30 and 65%, more preferably between 40 and 60%.

Polyenes which can be used in the process of the present invention include:
(a) polyenes capable of giving unsaturated units, such as:
  unconjugated linear dienes such as trans-1,4-hexadiene, cis-1,4-hexadiene, 6-methyl-1,5-heptadiene, 3,7-dimethyl-1,6-octadiene, 11-methyl-1,10-dodecadiene, 5,6-dimethyl-1,6-octadiene, 7-methyl-1,6-octadiene;
  monocyclic diolefins such as, for example, cis-1,5-cyclooctadiene and 5-methyl-1,5-cyclooctadiene;
  bicyclic diolefins such as, for example, 4,5,8,9-tetrahydroindene and 6- and/or 7-methyl-4,5,8,9-tetrahydroindene;
  alkenyl or alkylidene norbornenes such as, for example, 5-ethylidene-2-norbornene, 5-isopropylidene-2-norbornene, exo-5-isopropenyl-2-norbornene and 5-vinyl-2-norbornene;
  polycyclic diolefins such as, for example, dicyclopentadiene, tricyclo[6.2.1.0$^{2,7}$]-4,9-undecadiene and the 4-methyl derivative thereof;
(b) unconjugated diolefins capable of cyclopolymerization, such as 1,5-hexadiene, 1,6-hepta-diene and 2-methyl-1,5-hexadiene;
(c) conjugated dienes such as, for example, butadiene and isoprene.

As explained above the said elastomers can be used as such or they can be blended with predominantly crystalline propylene polymers in the preparation of heterophasic polymer compositions.

The polymeric compositions of the invention may be prepared by mixing the components in the melted state, for example in a single or twin screw extruder. The components of the mixture may be fed directly into the extruder or may be premixed in the solid state. However, it is preferred to prepare such composition via the reactor blending technique comprising two or more sequential polymerization step.

A further subject of the present invention is therefore a polyolefin composition, comprising:
(A) 5 to 95 parts by weight of a crystalline propylene polymer having an isotacticity index greater than 80, selected from polypropylene homopolymer and propylene copolymers containing 0.5 to 15 mol % of ethylene and/or an α-olefin having 4 to 10 carbon atoms, and
(B) from 5 to 95 parts by weight of the elastomeric copolymers defined above.

Preferably, the amount of (A) is from 10 to 90 and more preferably from 30 to 70 while for the component (B) preferably the amount is from 10 to 90 and more preferably from 30 to 70.

The propylene polymer constituting component (A) preferably has an isotactic index, determined by means of measuring the solubility in xylene, greater than 85, more preferably greater than 90.

As mentioned before in the component (B) the α-olefin $CH_2=CHR$ is preferably selected among those in which R is an alkyl having from 1 to 4 carbon atoms and in particular propylene. When polyene units are present their amount preferably ranges from 0.1 to 20% by weight, preferably from 1 to 10%. The content by weight of units derived from ethylene is preferably between 35 and 70%, more preferably between 40 and 60%. The content by weight of units derived from the α-olefin is preferably between 30 and 65%, more preferably between 40 and 60%.

As shown by the lower values of Shore A the heterophasic compositions of the invention are, for the same average content of ethylene, more flexible than the compositions of the prior art and this represent an important advantage in this application field.

The elastomers and the compositions which are the object of the present invention can be subjected to vulcanization or crosslinking in order to produce thermoplastic elastomeric compositions for use in the application sectors cited above.

The terms vulcanization and crosslinking comprise both the actual crosslinking or vulcanization of the elastomer and the reaction by means of which the grafting of the more or less crosslinked elastomer on the crystalline polypropylene phase can take place as a result of the reaction promoted by the crosslinking system used.

Among the various vulcanization techniques known in the art, the preferred technique is dynamic vulcanization. When working according to this technique, the compositions of the invention are subjected to kneading or to other shear forces in the presence of crosslinking agents and, if appropriate, coadjuvants thereof, at temperatures between 140 and 240° C., preferably at temperatures higher than the melting point of the crystalline phase. The compositions of the invention can be impregnated with an oil extender for regulating their hardness, either before the addition of the crosslinking agent or at the start or end of vulcanization. The oil extender used can be of various types, for example aromatic, naphthenic or preferably paraffinic. It is used in quantities such that weight ratios between the oil extender and component B of between 1:5 and 5:1, preferably between 1:2 and 2:1, are obtained.

The crosslinking agents which can be used are those commonly known in the art, such as organic peroxides, preferably having a half-life of the order of 10-200 seconds in the temperature range in which crosslinking normally takes place, and non-peroxidic agents such as the derivatives of 1,2-diphenylmethane, 1,2-diphenylethane and benzopinacol. A particularly suitable group of non-peroxidic agents consists of the furane derivatives described in EP361205, among which difurfalaldazine and 1,5-difurfuryl-1,4-pentadien-3-one can also be used.

As coadjuvant compounds for the crosslinking, liquid 1,2-polybutadiene or compounds of the triallyl cyanurate type can be used.

The elastomers of the present inventions when subject to crosslinking display valuable properties. In particular, the combination of good elastic properties, as evidenced by low values of compression and tension set, and high value tensile strength break makes them suitable products for all the conventional applications of these polymers. In addition, the high capability that they have in the incorporation of extending oils makes it possible to lower the Shore of the formulations until to the desired value without suffering from blooming problems.

Before they are subjected to dynamic vulcanization, the compositions of the invention can be provided with various additives, such as heat stabilizers, antioxidants, mineral fillers or any other type of agents customarily used in the art.

A further subject of the invention is therefore vulcanized thermoplastic compositions obtained by the vulcanization processes described above, as manufactured, as well as moulded articles obtainable from the said compositions.

The polymerization process of the invention for producing ethylene copolymers can be carried out either continuously or discontinuously. Said polymerization process can be carried out according to known techniques for example slurry polymerization using as diluent an inert hydrocarbon solvent, or bulk polymerization using the liquid monomer (for example propylene) as a reaction medium. Moreover, it is possible carrying out the polymerization process in gas-phase operating in one or more fluidized or mechanically agitated bed reactors.

The polymerization is generally carried out at temperatures ranging from 20 to 120° C., preferably from 40 to 80° C. Hydrogen or other compounds capable to act as chain transfer agents can be used to control the molecular weight of the polymer.

The catalyst component of the invention can be in the above processes as such or, alternatively, it can be pre-polymerized before being used in the main polymerization process. This is particularly preferred when the main polymerization process is carried out in the gas phase. The prepolymerization can be carried out with any of the olefins $CH_2=CHR$, where R is H or a C1-C10 hydrocarbon group. In particular, it is especially preferred to pre-polymerize ethylene or mixtures thereof with one or more α-olefins, said mixtures containing up to 20% in moles of α-olefin, forming amounts of polymer from about 0.1 g per gram of solid component up to about 1000 g per gram of solid catalyst component. The pre-polymerization step can be carried out at temperatures from −10° C. to 80° C., preferably from 5 to 50° C., in the liquid or gas phase. The co-catalyst can be the same as, or different from, the cocatalyst used in the main polymerization process. The pre-polymerization step can be performed in-line as a part of a continuous polymerization process or separately in a batch process. The batch pre-polymerization of the catalyst of the invention with ethylene in order to produce an amount of polymer ranging from 0.5 to 20 g per gram of catalyst component is particularly preferred. The prepolymerized catalyst component can also be subject to a further treatment with a titanium compound before being used in the main polymerization step. In this case the use of $TiCl_4$ is particularly preferred. The reaction with the Ti compound can be carried out by suspending the prepolymerized catalyst component in the liquid Ti compound optionally in mixture with a liquid diluent; the mixture is heated to 60-120° C. and kept at this temperature for 0.5-2 hours.

Examples of gas-phase processes wherein it is possible to use the catalysts of the invention are described in WO 92/21706, U.S. Pat. No. 5,733,987 and WO 93/03078. These processes comprise a pre-contact step of the catalyst components, a pre-polymerization step and a gas phase polymerization step in one or more reactors in a series of fluidized or mechanically stirred bed.

In the preparation of the elastomeric ethylene copolymers of the invention and of the deriving heterophasic compositions specific embodiments can be performed.

Preferably the heterophasic compositions of the invention are prepared by sequential polymerisation operating in at least two reactors in series in which, whatever the order and using the same catalyst of the invention in the various reactors, in one of the reactors the (co)polymer (A) is synthesised and in the other reactor the copolymer (B) is synthesised. The polymerization can conveniently be carried out in the gas phase using a fluidised bed reactor.

Preferably in the first reactor the (co)polymer (A) is synthesised by polymerizing propylene optionally in the mixture with minor amounts of ethylene and/or n α-olefin $CH_2=CHR$, where R is an alkyl radical having from 2 to 10 carbon atoms, in the presence of the catalyst of the invention. In a subsequent reactor, a mixture of ethylene and at least one α-olefin $CH_2=CHR^1$, where $R^1$ is an alkyl radical having 1 to 10 carbon atoms and optionally a diene, is polymerised to obtain the copolymer B described above.

When an elastomeric ethylene copolymer containing diene units is to be produced the polymerization can be suitably be carried out by (a) impregnating with at a least a portion of the diene the prepolimerized catalyst of the invention, or (b) in case an heterophasic composition is to be produced, by impregnating with the diene the crystalline portion (A) of the heterophasic composition, before carrying out the copolymerization of ethylene, alpha-olefin and diene. By adopting this technique a higher polymerization activity and a better diene incorporation in the polymer will be obtained.

The following examples are given by way of non-limiting illustration of the invention.

CHARACTERIZATIONS

Comonomer Content

The content of 1-butene in the ethylene-butene copolymers was determined via Infrared Spectrometry.

The proportions of propylene in the ethylene/propylene copolymers were determined by $^{13}C$ NMR analysis carried out using a Bruker AC200 machine, at a temperature of 120° C., on samples prepared by dissolving about 300 mg of polymer in 2.5 cc of a 3:1 trichloro-benzene/$C_2D_2Cl_4$ mixture. The spectra were recorded with the following parameters:

Relaxation delay=12 sec,
Number of scans=2000-2500.

The Intrinsic Viscosity [η] was Measured in Tetraline at 135° C.

The differential Scanning Calorimetry (DSC)

Calorimetric measurements were performed by using a differential scanning calorimeter DSC Mettler. The instrument is calibrated with indium and tin standards. The weighted sample (5-10 mg), obtained from the Melt Index determination, was sealed into aluminum pans, heated to 200° C. and kept at that temperature for a time long enough (5 minutes) to allow a complete melting of all the crystallites. Successively, after cooling at 20° C./min to −20° C., the peak temperature was assumed as crystallisation temperature (Tc). After standing 5 minutes at 0° C., the sample was heated to 200° C. at a rate of 20° C./min. In this second heating run, the peak temperature was assumed as melting temperature (Tm) and the area as the global melting hentalpy (ΔH).

The molecular weight distribution was determined by GC carried out on a Waters 150 machine in ortho-dichlorobenzene at 135° C.

Melt Index:

Melt index (M.I.) are measured at 190° C. following ASTM D-1238 over a load of:

2.16 Kg, MI E=$MI_{2.16}$.
21.6 Kg, MI F=$MI_{21.6}$.

The ratio: F/E=MI F/MI E=$MI_{21.6}/MI_{2.16}$ is then defined as melt flow ratio (MFR).

Density:

Density was determined on the homogenised polymers (from the Melt Index determination) by using a gradient column and following the ASTM D-1505 procedure.

Xylene Solubility (XSRT):

The solubility in xylene at 25° C. was determined according to the following modalities: about 2.5 g of polymer and 250 ml of o-xylene were placed in a round-bottomed flask provided with cooler, reflux condenser and kept under nitrogen. The obtained mixture was heated to 135° C. and was kept under stirring for about 60 minutes. The final solution was allowed to cool to 25° C., under continuous stirring; it was then filtered off and divided in two portions of 100 ml each. The first solution was evaporated in a nitrogen flow at 140° C. to reach a constant weight; the weight of the soluble portion was calculated (XSRT). The latter was treated with 200 ml of acetone and the precipitated polymer was recovered by filtration and dried at 70° C. under vacuum. From this weight, the amount of polymer insoluble in acetone is calculated (amorphous part).

Shore (A) Measured According to ASTM D2240

Determination of the regioinvertions: determined by means of $C^{13}$-NMR according to the methodology described by J. C. Randall in "Polymer sequence determination Carbon 13 NMR method", Academic Press 1977. The content of regioinvertions is calculated on the basis of the relative concentration of $S_{\alpha\beta}+S_{\beta\beta}$ methylene sequences.

Compression set 100° C.: ASTM D395, method B
Tension set 100° C.: ASTM D412, using a sample according to ASTM 1329.
Tension set 23° C.: ASTM D412, using a sample according to ASTM 1329.
Elongation at break: ASTM D412, using a microspecimen.
Tensile strength: ASTM D412
E100 ASTM D412
E200 ASTM D412

EXAMPLES

Ethylene/1-butene Polymerization General Procedure

A 4.0 liter stainless-steel autoclave equipped with a magnetic stirrer, temperature, pressure indicator, feeding line for ethylene, propane, 1-butene, hydrogen, and a steel vial for the injection of the catalyst, was purified by fluxing pure nitrogen at 70° C. for 60 minutes. It was then washed with propane, heated to 75° C. and finally loaded with 800 g of propane, 1-butene (as reported in table 2), ethylene (7.0 bar, partial pressure) and hydrogen (2.0 bar, partial pressure).

In a 100 $cm^3$ three neck glass flask were introduced in the following order, 50 $cm^3$ of anhydrous hexane, 9.6 $cm^3$ of 10% by wt/vol, TEAL/hexane solution, optionally an external donor (E.D., as reported in table 2) and the solid catalyst (in the amount reported in table 2). They were mixed together and stirred at room temperature for 10 minutes and then introduced into the reactor through the steel vial by using a nitrogen overpressure.

Under continuous stirring, the total pressure was maintained constant at 75° C. for 120 minutes by feeding ethylene. At the end the reactor was depressurised and the temperature was dropped to 30° C. The recovered polymer was dried at 70° C. under a nitrogen flow and weighted.

Ethylene/Propylene Polymerization: General Procedure

In a 4.25 liter autoclave fitted with a stirrer, a manometer, a temperature indicator, a system for feeding the catalyst, monomer supply lines and a jacket for thermostatic regulation, previously purged by flushing with ethylene at 80° C., are introduced at room temperature 242 g of hexane. The temperature was brought to 50° C. and then 392 g of propane and the reported amount of hydrogen are introduced into the reactor. Afterwards, the amounts of ethylene and propylene given in Table 3 were introduced into the reactor. The catalyst component the triethylaluminum and optionally the external electron donor compound were injected under a pressure of ethylene and the polymerization took place. During the polymerization a mixture of ethylene/propylene, the composition of which is reported in table 3, was fed in order to keep the pressure constant. After the polymerization time reported in table 3 the reaction was stopped, the polymer obtained was isolated by removal of the non-reacted monomers and was then dried under vacuum.

Example 1

Preparation of the Solid Catalyst Component

The spherical support, prepared according to the general method described in ex. 2 of U.S. Pat. No. 4,399,054 (but operating at 3000 rpm instead of 10000) was subjected to thermal treatment, under nitrogen flow, within the temperature range of 50-150° C., until spherical particles having a residual alcohol content of about 35 wt. % (1.1 mol of alcohol per mol of $MgCl_2$) were obtained.

50 g of this support were charged, under stirring at 0° C., to a 1500 $cm^3$ reactor containing 1000 $cm^3$ of pure $TiCl_4$. The temperature was slowly raised to 40° C. and then 14.2 $cm^3$ of 2-methyl-2-octyl-1,3dimethoxypropane, were slowly added, then the temperature was further raised to 100° C. in 60 minutes and kept constant for 60 minutes. Stirring was discontinued, settling was allowed to occur and the liquid phase was removed at the temperature of 100° C. Further 1000 $cm^3$ of freshly $TiCl_4$ were added and the temperature was raised to 110° C. and kept constant for 30 minutes. After 10 minutes settling the liquid phase was removed at the temperature of 100° C. A third treatment with $TiCl_4$ at 110° C. for 30 minutes was performed, and, after settling and siphoning, the residue was washed with anhydrous heptane (500 $cm^3$ at 90° C. then 3 times (500 $cm^3$ each time) with anhydrous hexane at 60° C. and further 4 at room temperature. The component in spherical form was vacuum dried at 50° C. 41.5 g of catalyst was recovered. The catalyst characteristics are reported in table 1. The catalyst was then used in the ethylene/butene polymerization procedure according to the conditions reported in table 2 together with the polymerization results.

Example 2

115 cm$^3$ of dry heptane were charged to a 350 cm$^3$ reactor containing 20 g of the support prepared as described in Example 1 and the temperature was lowered and set to −10° C. Under stirring at −10° C., 3.8 cm$^3$ of 2-methyl-2octyl-1, 3dimethoxypropane and then 172 cm$^3$ of 10% wt/vol triethyl aluminum alkyl in heptane, were slowly added in 60 minutes. The temperature was then raised to 20° C. in 90 minutes, kept at 20° C. for 60 min. and then raised to 70° C. in 150 min. and kept constant for 60 minutes. Stirring was discontinued, settling was allowed to occur and the liquid phase was removed at the temperature of 70° C. The residue was washed with anhydrous heptane at 70° C. (once) and at 25° C. (twice). The spherical solid residue was suspended in 300 cm$^3$ of dry heptane and the temperature lowered to 0° C. In 60 minutes were slowly added 39 cm$^3$ of Ti Cl$_4$ diluted with 11 cm$^3$ of heptane. At the end, the temperature was raised to 80° C. in 45 minutes and kept constant for 180 minutes. After 10 minutes settling the liquid phase was removed and the residue was washed with anhydrous heptane at 80° C. (once) then 3 times with anhydrous hexane at 60° C. and further 4 at room temperature. The component in spherical form was vacuum dried at 50° C. 19.8 g of catalyst was recovered. The catalyst characteristics are reported in table 1. The catalyst was then used in the ethylene/butene polymerization procedure according to the conditions reported in table 2 together with the polymerization results.

Examples 3-5

50 g of this support prepared as described in Example 1 were charged, under stirring at 0° C., to a 1500 cm$^3$ reactor containing 1000 cm$^3$ of pure TiCl$_4$. The temperature was slowly raised to 40° C. and then 5.2 cm$^3$ of 2-ethyl-2-n-butyl-1,3dimethoxypropane, under stirring at 0° C., were slowly added to a 750 cm$^3$ reactor containing 500 cm$^3$ of pure TiCl$_4$. The temperature was maintained at 0° C. and then 21 g of the above described support, were charged. The temperature was raised to 100° C. in 60 minutes and kept constant for 60 minutes. Stirring was discontinued, settling was allowed to occur and the liquid phase was removed at the temperature of 100° C. Further 500 cm$^3$ of freshly TiCl$_4$ were added and the temperature was raised to 120° C. and kept constant for 60 minutes. After 10 minutes settling the liquid phase was removed at the temperature of 100° C. The residue was washed with anhydrous heptane at 90° C. then 3 times with anhydrous hexane at 60° C. and further 4 at room temperature. The component in spherical form was vacuum dried at 50° C. 14.6 g of catalyst was recovered. The catalyst characteristics are reported in table 1. The catalyst was then used in the ethylene/butene polymerization procedure according to the conditions reported in table 2 together with the polymerization results.

Examples 6-8

Preparation of Solid Catalyst Component

The spherical support, was prepared according to the general method described in ex. 2 of U.S. Pat. No. 4,399,054 (but operating at 3000 rpm instead of 10000) having a residual alcohol content of about 57.4 wt. % (about 2.7 mol of alcohol per mol of MgCl$_2$).

14.2 cm$^3$ of 2-methyl-2octyl-1,3dimethoxypropane, under stirring at 0° C., were slowly added to a 750 cm$^3$ reactor containing 250 cm$^3$ of pure TiCl$_4$. The temperature was maintained at 0° C. and then 11 g of the above described support, were charged. The temperature was raised to 100° C. in 60 minutes and kept constant for 120 minutes. Stirring was discontinued, settling was allowed to occur and the liquid phase was removed at the temperature of 100° C. Further 250 cm$^3$ of freshly TiCl$_4$ were added and the temperature was raised to 120° C. and kept constant for 60 minutes. After 10 minutes settling the liquid phase was removed at the temperature of 100° C. The residue was washed with anhydrous heptane (200 cm$^3$) at 90° C. then 5 times (200 cm$^3$ each time) with anhydrous hexane at 60° C. and one further at room temperature. The component in spherical form was vacuum dried at 50° C. 6.9 g of catalyst was recovered. The catalyst characteristics are reported in table 1.

The polymerization has been carried out according to the general ethylene/propylene polymerization procedure under the conditions reported in table 3. The characterization of the polymer is reported in table 4.

Comparison Example 1

Preparation of Solid Catalyst Component

The same catalyst preparation disclosed in example 6 was repeated with the only difference that 9,9'bis-(dimethoxy)-fluorene was used instead of 2-methyl-2octyl-1,3dimethoxypropane. The polymerization has been carried out according to the general ethylene/propylene polymerization procedure under the conditions reported in table 3. The characterization of the polymer is reported in table 4.

Example 9

52 g of the support prepared as described in Example 1 were charged, under stirring at 0° C., to a 1500 cm$^3$ reactor containing 1000 cm$^3$ of pure TiCl$_4$. The temperature was slowly raised to 40° C. and then 14.7 cm$^3$ of 2-methyl-2octyl-1,3dimethoxypropane, were slowly added, then the temperature was further raised to 100° C. in 60 minutes and kept constant for 60 minutes. Stirring was discontinued, settling was allowed to occur and the liquid phase was removed at the temperature of 100° C. Further 1000 cm$^3$ of freshly TiCl$_4$ and 14.7 cm$^3$ of 2-methyl-2octyl-1,3dimethoxypropane, were added and the temperature was raised to 110° C. and kept constant for 30 minutes. After 10 minutes settling the liquid phase was removed at the temperature of 100° C. A third treatment with TiCl$_4$ at 110° C. for 30 minutes was performed, and, after settling and siphoning, the residue was washed with anhydrous heptane (500 cm$^3$ at 70° C. (twice) then 4 times (500 cm$^3$ each time) with anhydrous hexane at 60° C. and further 4 at room temperature. The component in spherical form was vacuum dried at 50° C. 43.2 g of catalyst was recovered. The catalyst characteristics are reported in table 1.

The polymerization has been carried out according to the general ethylene/propylene polymerization procedure under the conditions reported in table 3. The characterization of the polymer is reported in table 4.

Comparison Examples 2-3

Catalyst Component Preparation

The same catalyst preparation disclosed in example 9 was repeated with the only difference that diisobutylphthalate was used instead of 2-methyl-2octyl-1,3dimethoxypropane. The polymerization has been carried out according to the general ethylene/propylene polymerization procedure under the conditions reported in table 3. The characterization of the polymer is reported in table 4.

Examples 10-11

Catalyst Preparation

The catalyst was prepared as described in Example 2. The catalyst characteristics are reported in table 1. The polymerization has been carried out according to the general ethylene/propylene polymerization procedure under the conditions reported in table 3. The characterization of the polymer is reported in table 4.

Example 12

Preparation of an Elastomeric Heterophasic Composition Directly in the Reactor 32.7 g of a solid catalytic component, prepared according to Example 6, were precontacted in a 50 ml glass flask with 12.3 mg of triethylaluminium (TEAL) in 5 ml of anhydrous hexane. The mixture was fed under propylene flow to a 4.25 liters steel autoclave, previously purged by successive washings first with hexane for one hour at 80° C. and then with gaseous propylene for one hour at 80° C. 1150 g of liquid propylene together with 1500 cm$^3$ of hydrogen were then fed at 30° C. The temperature was then brought to 60° C. and the polymerization took place for 20 minutes. After that period propylene was vented and the reactor went to room temperature. In the same reactor at 30° C., 204 cm$^3$ of H$_2$ 34 g of ethylene and 132 g of propylene were fed the temperature was raised to 60° C. and the polymerization started again. The composition of the bath was kept constant by feeding a mixture of the two monomers with 50% by weight of ethylene. Copolymerization was carried out for 95 minutes. This gave 669 g of total polymer whose properties are shown in Table 5.

Comparative Example 4

The same polymerization procedure of example 11 was carried out with the difference that the same catalyst system disclosed in comparative example 2 was used. Copolymerization results are shown in Table 5.

Example 13

10 g of the polymer obtained as disclosed in Example 7 were impregnated with 30 g of Flexon 876-paraffin oil. This mixture was introduced into an internal mixer of the Banbury type at a temperature of 180° C., at 60 R.I.P. together with 50 g of carbon black, 5 g of ZnO, 2.5 g of Triallyl cyanurate (TAC) and 6 g of Peroximon F40 and the mixture was mixed for 6 minutes for the dynamic crosslinking of the product. 30 g of mixture were moulded in a plate press for 5 minutes at 200° C. and then cooled in a second press maintained for 10 minutes at 23° C. After conditioning at room temperature for 48 hours, the plates obtained (120× 120×2 mm) were characterized. The results of the characterization are shown in Table 6.

Comparative Example 5-6

The same crosslinking procedure disclosed in Example 13 was carried out on the product obtained in comparison example 2-3. The results of the characterization are shown in Table 6.

TABLE 1

Catalyst composition

| Example N | Ti$^t$ wt. % | Ti$^{3+}$ wt. % | Mg wt. % | Cl wt. % | I.D. wt. % | Solv. wt. % |
|---|---|---|---|---|---|---|
| 1 | 2.7 | — | 18.3 | 61.4 | 13.5 | 2.8 |
| 2 and 10 | 5.2 | 4.0 | 15.7 | 60.5 | 12.2 | 2.3 |
| 3-5 | 3.2 | — | 13.7 | 50.5 | 10.1 | 3.8 |
| 6-8 | 3.5 | — | 17.2 | 60.1 | 18 | 1.6 |
| 9 | 2.6 | — | 18.5 | 58.7 | 15.7 | 1.0 |

TABLE 2

Ethylene/Butene copolymerization

| Polym. Example | Catalyst mg | E.D: Type | Al/E.D. m. ratio | 1-C4-g | H2 bar | time min | Polymer g | Activity Kg/gcat | Melt Index E dg/mi | F/E | 1-C$_4$- (I.R.) wt. % | Density g/cc | D.S.C. Tm ° C. | ΔH J/g | X.S. wt. % |
|---|---|---|---|---|---|---|---|---|---|---|---|---|---|---|---|
| 1 | 19.6 | 2M2O-DMP | 14 | 150 | 2.0 | 120 | 190 | 9.7 | 0.16 | 32.4 | 6.2 | 0.9160 | 125.0 | 120.4 | 13.6 |
| 2 | 21.8 | — | — | 200 | 2.0 | 120 | 325 | 14.9 | 0.81 | 28.1 | 7.1 | 0.9189 | 125.1 | 136.1 | 12.4 |
| 3 | 20.7 | — | — | 100 | 2.0 | 120 | 330 | 15.9 | 2.03 | 29.3 | 7.8 | 0.9206 | 128.2 | 136.5 | 11.0 |
| 4 | 25.2 | CHMMS | 15 | 200 | 2.0 | 120 | 285 | 11.3 | 0.11 | 23.5 | 9.6 | 0.9188 | 124.6 | 120.7 | 10.2 |
| 5 | 25.7 | 2E2B-DMP | 15 | 200 | 2.0 | 120 | 240 | 9.3 | <0.03 | | 8.2 | 0.9192 | 124.5 | 123.1 | 10.4 |

2M2O-DMP = 2-Methyl-2-Octyl-1,3-diMethoxyPropane
2E2B-DMP = 2-Ethyl-2-n-Butyl-1,3-diMethoxyPropane
CHMMS = cyclohexylmethyldimethoxysilane

TABLE 3

Ethylene/Propylene Polymerization

| Example | Ext. Don. type | Cat mg | P barg | H2 L | Time min. | C2 Bath g | C3 Bath g | C2 feed g | C3 Feed g | Polymer g |
|---|---|---|---|---|---|---|---|---|---|---|
| 6 | — | 10.4 | 16.8 | 1.75 | 47 | 1.9 | 38.1 | 50 | 50 | 119 |
| 7 | — | 10.7 | 18.1 | 2.2 | 25 | 30 | 367 | 50 | 50 | 98 |
| 8 | MODMS | 11.5 | 17.2 | 1 | 22 | 31 | 409 | 55 | 45 | 174 |
| Comp. 1 | MODMS | 6.7 | 18.0 | 2.2 | 33 | 39 | 407 | 45 | 55 | 150 |
| 9 | 2M2O-DMP | 19.0 | 17.0 | 0.5 | 23 | 35 | 411 | 56 | 64 | 145 |
| Comp. 2 | DCPDMS | 12.8 | 18.1 | 2.5 | 52 | 39 | 408 | 50 | 50 | 126 |
| Comp. 3 | DCPDMS | 10.8 | 18.0 | 2.8 | 25 | 39 | 408 | 50 | 50 | 119 |
| 10 | 2M2O-DMP | 21.0 | 16.8 | 0.5 | 47 | 29 | 417 | 56 | 64 | 110 |
| 11 | 2M2O-DMP | 27 | 16.3 | 0.5 | 86 | 20 | 426 | 56 | 64 | 126 |

2M2O-DMP = 2-Methyl-2-Octyl-1,3-dimethoxypropane
MODMS = methyl-octyl-dimethoxysilane
DCPDMS = dicyclopentyldimethoxysilane

TABLE 4

Ethylene/propylene polymers characterization

| Example | 2-1 regioinv. % | Mw/Mn | IV dl/g | C2 (NMR) % wt | XI % wt | Tm °C. | ΔH J/g | Shore A | Tensile Strength at Break MPa | Elong. at Break % | Max Tens. Strength MPa | Max Elong. % | E100 MPa | E200 MPa |
|---|---|---|---|---|---|---|---|---|---|---|---|---|---|---|
| 6 | <1 | 5.4 | 2.79 | 42.0 | 5.0 | 116.5 | 0.6 | 39 | 0.3 | 825 | 1.6 | 810 | 0.6 | 0.6 |
| 7 | <1 | 5.1 | 2.77 | 53.0 | 8.5 | 119.3 | 1.6 | 45 | 1.2 | 794 | 1.9 | 780 | 0.8 | 0.8 |
| 8 | <1 | 6.1 | 2.92 | 43.3 | 9.1 | 115.2 | 2.1 | 45 | 2.7 | 965 | 2.7 | 970 | 1.1 | 1.0 |
| Comp. 1 | <1 | 5.1 | 3.20 | 43.9 | 13.9 | 117.6 | 2.1 | 55 | 4.1 | 931 | 4.8 | 924 | 1.2 | 1.2 |
| 9 | <1 | 5.9 | 3.35 | 47.3 | 12.3 | 119.1 | 2.6 | 44 | 3.1 | 875 | 3.2 | 890 | 1.1 | 1.1 |
| Comp. 2 | <1 | 8.7 | 3.20 | 45.0 | 15.4 | 120.2 | 11.3 | 58 | 4.3 | 880 | 4.4 | 869 | 1.3 | 1.3 |
| Comp. 3 | <1 | 6 | 3.16 | 49.0 | 18.9 | 121.1 | 13.0 | 56 | 3.1 | 869 | 3.5 | 864 | 1.3 | 1.3 |
| 10 | <1 | 5.8 | 3.21 | 58.0 | 12.0 | 118.7 | 4.9 | 42 | 2.3 | 710 | 2.3 | 710 | 1.0 | 1.0 |
| 11 | <1 | 5.7 | 3.1 | 51 | 8.8 | 118.1 | 2.3 | 36 | n.d | n.d | n.d | n.d | n.d | n.d |

TABLE 5

Heterophasic composition characterization

| EXAMPLE | C2 % wt | IV dl/g | XI % wt | Tm °C. | ΔH J/g | Shore A | Shore D |
|---|---|---|---|---|---|---|---|
| Comp. 3 | 40.1 | 2.80 | 49 | 166.9 | 40.0 | 88 | 39 |
| 12 | 40.0 | 2.31 | 28 | 160.2 | 17.5 | 56 | n.a |

TABLE 6

Characterization of crosslinked ethylene/propylene copolymers

| EXAMPLE | Sample | Tensile Strength at Break MPa | Elongation at Break % | E100 Mpa | E200 MPa | C. Set 22 hr/70° C. % | Tension Set 200% % | Shore A |
|---|---|---|---|---|---|---|---|---|
| COMP: 5 | Comp 2 | 8.36 | 340 | 2.34 | 4.73 | 30 | 28 | 64 |
| COMP. 6 | Comp. 3 | 8.24 | 330 | 2.23 | 4.51 | 29 | 30 | 64 |
| 13 | Ex. 7 | 10.98 | 390 | 1.95 | 4.57 | 21 | 18 | 61 | and content by weight of ethylenic units, calculated on the basis of the whole polymer, such that the point defined by such values falls below the curve defined by the following equation:

$$Y = 0.0438X^2 - 4.1332X + A$$

where Y is the value of the Shore A, X is the weight percentage of ethylene units in the polymer calculated by NMR and A is 145.

The invention claimed is:

1. Ethylene copolymers containing from 35 to 70% by weight of ethylene, from 30 to 65% by weight of an olefin $CH_2=CHR$, in which R is a hydrocarbyl radical with 1-12 carbon atoms, and from 0 to 10% of a polyene characterized by (i) a Molecular Weight Distribution expressed by Mw/Mn of higher than 3, (ii) a content of 2-1 regioinvertions of the α-olefin units of lower than 5% and (iii) a value of Shore A 2. The ethylene copolymers according to claim 1 in which A is 137.

3. The ethylene copolymers according to claim 1 further characterized by a content of xylene insoluble fraction lower than 15%.

4. The ethylene copolymers according to claim 1 in which the content by weight of units derived from ethylene ranges from 40 to 60% and the content by weight of units derived from the α-olefin ranges from 40 to 60%.

5. The ethylene copolymers according to claim 1 in which the α-olefin CH$_2$=CHR is selected among those in which R is an alkyl having from 1 to 4 carbon atoms.

6. The ethylene copolymers according to claim 5 in which the α-olefin is propylene.

7. Crosslinked ethylene copolymers obtained by subjecting copolymers containing from 35 to 70% by weight of ethylene, from 30 to 65% by weight of an olefin CH$_2$=CHR, in which R is a hydrocarbyl radical with 1-12 carbon atoms, and from 0 to 10% of a polyene characterized by (i) a Molecular Weight Distribution expressed by Mw/Mn of higher than 3, (ii) a content of 2-1 regioinvertions of the α-olefin units of lower than 5% and (iii) a value of Shore A and content by weight of ethylenic units, calculated on the basis of the whole polymer, such that the point defined by such values falls below the curve defined by the following equation:

$$Y=0.0438X^2-4.1332X+A$$

where Y is the value of the Shore A, X is the weight percentage of ethylene units in the polymer calculated by NMR and A is 145, to crosslinking conditions.

8. A polyolefin composition, comprising:
(A) from 5 to 95 parts by weight of a crystalline propylene polymer having an isotactic index greater than 80, selected from polypropylene homopolymer and propylene copolymers containing 0.5 to 15 mol % of ethylene and/or an α-olefin having 4 to 10 carbon atoms, and
(B) from 5 to 95 parts by weight of an ethylene/α-olefin copolymer containing from 35 to 70% by weight of ethylene, from 30 to 65% by weight of an olefin CH$_2$=CHR, in which R is a hydrocarbyl radical with 1-12 carbon atoms, and from 0 to 10% of a polyene characterized by (i) a Molecular Weight Distribution expressed by Mw/Mn of higher than 3, (ii) a content of 2-1 regioinvertions of the α-olefin units of lower than 5% and (iii) a value of Shore A and content by weight of ethylenic units, calculated on the basis of the whole polymer, such that the point defined by such values falls below the curve defined by the following equation:

$$Y=0.0438X^2-4.1332X+A$$

where Y is the value of the Shore A, X is the weight percentage of ethylene units in the polymer calculated by NMR and A is 145.

9. The polyolefin composition according to claim 8 comprising from 10 to 90 parts by weight of (A) and from 10 to 90 parts by weight of (B).

10. The polyolefin composition according to claim 9 comprising from 30 to 70 parts by weight of (A) and from 30 to 70 parts by weight of (B).

11. A polyolefin composition obtained by subjecting to crosslinking conditions a composition comprising:
(A) from 5 to 95 parts by weight of a crystalline propylene polymer having an isotactic index greater than 80, selected from polypropylene homopolymer and propylene copolymers containing 0.5 to 15 mol % of ethylene and/or an α-olefin having 4 to 10 carbon atoms, and
(B) from 5 to 95 parts by weight of an ethylene/α-olefin copolymer containing from 35 to 70% by weight of ethylene, from 30 to 65% by weight of an olefin CH$_2$=CHR, in which R is a hydrocarbyl radical with 1-12 carbon atoms, and from 0 to 10% of a polyene characterized by (i) a Molecular Weight Distribution expressed by Mw/Mn of higher than 3, (ii) a content of 2-1 regioinvertions of the α-olefin units of lower than 5% and (iii) a value of Shore A and content by weight of ethylenic units, calculated on the basis of the whole polymer, such that the point defined by such values falls below the curve defined by the following equation:

$$Y=0.0438X^2-4.1332X+A$$

where Y is the value of the Shore A, X is the weight percentage of ethylene units in the polymer calculated by NMR and A is 145.

* * * * *